United States Patent
Kipp et al.

[11] Patent Number: 6,057,681
[45] Date of Patent: May 2, 2000

[54] MAGNETIC BEARING INCLUDING A SENSOR FOR SENSING FLUX IN THE MAGNETIC FLUX PATH

[75] Inventors: Ronald W. Kipp, Croydon, Pa.; Joseph Imlach, Anchorage, Ak.

[73] Assignee: Kingsbury, Inc., Philadelphia, Pa.

[21] Appl. No.: 08/873,581

[22] Filed: Jun. 12, 1997

[51] Int. Cl.[7] .............................. H01L 43/06; G01B 7/14; G01B 7/30; H02K 7/09
[52] U.S. Cl. .................... 324/207.2; 324/207.22; 324/207.25; 310/90.5
[58] Field of Search .................. 324/207.11, 207.2, 324/207.21, 207.25, 207.26, 207.22; 310/68 B, 90.5

[56] References Cited

U.S. PATENT DOCUMENTS

| | | |
|---|---|---|
| 5,095,237 | 3/1992 | Bardas et al. . |
| 5,148,069 | 9/1992 | Nonaka et al. . |
| 5,164,668 | 11/1992 | Alfors . |
| 5,274,328 | 12/1993 | Begin et al. . |
| 5,332,965 | 7/1994 | Wolf et al. . |
| 5,355,041 | 10/1994 | Shirao et al. ......................... 310/90.5 |
| 5,444,369 | 8/1995 | Luetzow . |
| 5,455,472 | 10/1995 | Weiss et al. . |

*Primary Examiner*—Walter E. Snow
*Attorney, Agent, or Firm*—Renner, Otto, Boisselle & Sklar PLL

[57] ABSTRACT

A flux position sensor for magnetic bearings applications is provided by creating a secondary, or shunt, flux path in parallel with a main flux path of a magnetic bearing. The secondary flux path is formed such that a small amount of bearing magnetic flux is shunted from the main path into the secondary path. The amount of shunted flux varies in a known relationship with the flux density and/or the position of the element being supported by the bearing. By quantifying the amount of shunted flux, using any number of conventional methods, the position of the supported element can be determined. Therefore, the flux position sensor forms an integral part of a closed loop control system for an active magnetic bearing. The same sensor can be used simply for measuring flux density in a magnetic bearing or other device.

36 Claims, 7 Drawing Sheets

The surface represented in Figure 9 can be approximated by the equation:

$$B(x,i) = a(i) + b(i) \cdot x + c(i) \cdot x^2 + d(i) \cdot x^3$$

A curve fit of this example surface results in the following coefficients $$a(i) := 14.2158 \cdot i - 12.2095 \cdot i^2 + 48.7454 \cdot i^3 - 27.7645 \cdot i^4$$

$$b(i) := 2.46105 - 7.36684 \cdot i + 49.9859 \cdot i^2 - 60.5381 \cdot i^3 + 18.5224 \cdot i^4$$

$$c(i) := -.486065 - 7.13401 \cdot i + 88.0890 \cdot i^2 - 180.308 \cdot i^3 + 99.3232 \cdot i^4$$

$$d(i) := .92304 - 17.4822117 \cdot i^2 + 26.1171217 \cdot i^3 + 1.8207053 \cdot i - 10.496617 \cdot i^4$$

Solving the equation of B(x,i) for x yields three roots. Two of the roots contain imaginary terms and are not realistic solutions. The remaining root is displayed below. The rather lengthy repeated term T(B,i) has been extracted to simplify the presentation of the result.

$$T(B,i) := \sqrt{4 \cdot b(i)^3 \cdot d(i) - b(i)^2 \cdot c(i)^2 + 18 \cdot b(i) \cdot c(i) \cdot d(i) \cdot B - 18 \cdot b(i) \cdot c(i) \cdot d(i) \cdot a(i) + 27 \cdot d(i)^2 \cdot B^2 - 54 \cdot d(i)^2 \cdot B \cdot a(i) - 4 \cdot B \cdot c(i)^3 + 27 \cdot d(i)^2 \cdot a(i)^2 + 4 \cdot a(i) \cdot c(i)^3}$$

$$x(B,i) := \left[ \frac{1}{6} \frac{b(i)}{d(i)^2} c(i) + \frac{1}{2} \frac{(B-a(i))}{d(i)} - \frac{1}{27} \frac{c(i)^3}{d(i)^3} + \frac{1}{18} T(B,i) \frac{\sqrt{3}}{d(i)^2} \right]^{\left(\frac{1}{3}\right)} - \frac{\left( \frac{1}{3} \frac{b(i)}{d(i)} - \frac{1}{9} \frac{c(i)^2}{d(i)^2} \right)}{\left[ \frac{1}{6} \frac{b(i)}{d(i)^2} c(i) + \frac{1}{2} \frac{(B-a(i))}{d(i)} - \frac{1}{27} \frac{c(i)^3}{d(i)^3} + \frac{1}{18} T(B,i) \frac{\sqrt{3}}{d(i)^2} \right]^{\left(\frac{1}{3}\right)}} - \frac{1}{3} \frac{c(i)}{d(i)}$$

This approximation agrees, to within 5%, with the original surface. Higher order polynomil fits, or other curve types, could yield higher accuracy.

FIGURE 10

MAGNETIC BEARING INCLUDING A SENSOR FOR SENSING FLUX IN THE MAGNETIC FLUX PATH

TECHNICAL FIELD

The present invention relates generally to magnetic bearings, and more particularly to a flux position sensor for use in radial and/or axial active magnetic bearings.

BACKGROUND OF THE INVENTION

Magnetic bearings are well known in the art. Magnetic bearings are commonly utilized for supporting a rotatable or oscillatory mass. An active magnetic bearing is a device which supports the mass in an actively controlled magnetic field. Typically the mass is supported by a plurality of radial magnetic bearings, and one or more thrust magnetic bearings. In most cases, these types of magnetic bearings use opposing attractive magnetic fields to support and control the mass. Thus, support along a given axis is obtained by balancing the pull of two opposing magnetic fields established by the bearings. Unfortunately, systems utilizing such bearings are inherently unstable. Closed loop control, which is based on the position of the supported mass, is required to provide stability. Toward this end, current state of the art active magnetic bearings include separate position sensing systems for measuring the position of the supported mass. This position information is then processed by a control system which regulates the current in the electromagnetic coils of actuators within the bearings. The current provides the magnetic flux for the gaps between the actuators and the supported mass. The magnetic flux provides the force required to control the position of the mass.

Several technologies have been used to provide position sensing information in association with magnetic bearings. Such technologies include the use of eddy current sensors, optical sensors, capacitive sensors, and reluctance sensors as position sensor elements. Each of these technologies has in common the fact that a sensor element is required separate from the magnetic bearing actuator. Such position sensor elements are typically mounted outside of an area occupied by the magnetic bearing itself for several reasons. These reasons can include restrictions on the physical space available within the bearing actuator, non-compatibility of the position sensing system to actuator environment, and electromagnetic interference between the bearing actuator and the position sensor.

FIG. 1 shows a radial cross sectional view of a typical radial magnetic bearing 20 containing an inductive type sensor. More specifically, the bearing 20 includes a housing 22 which surrounds an actuator element 24. The actuator element 24 includes an electromagnetic coil 26, and an end plate 28 is disposed adjacent the actuator element 24. The supported mass 30 includes a rotor carrier 32 on which rotor laminations 34 are formed. A rotor end plate 36 is disposed adjacent the laminations 34 as shown.

An inductive sensor element 40 is positioned within the housing 22 separate and axially offset from the actuator element 24. Specifically, a spacer element 41 is positioned between the sensor element 40 and the actuator element 24. The supported mass 30 also includes a sensor rotor 44 positioned proximate the sensor element 40, with a spacer 46 between the sensor rotor 44 and the rotor laminations 34. In addition to being physically separate from the actuator element 24, the sensor 40 requires its own driving coils 42 which require separate driving electronics. Also, in some instances (such as canned applications discussed below) it is desirable to isolate electrically the sensor 40 from the actuator 24.

FIG. 2 shows a similar radial cross sectional view of a radial bearing, but with a sensor configuration typical of a capacitive, optical, or eddy current type position sensor element 50. Note that the sensor element 50 consists of a separate probe that is installed so as to be axially offset from the bearing actuator element 24. These types of sensor elements 50 also require separate driver electronics.

The physical separation between the position sensor elements and the magnetic bearing itself introduces an instability mechanism which is commonly referred to as a "non-co-location problem". This problem manifests itself when magnetic bearings are applied to flexible shaft systems in which a shaft node or stationary point occurs between the bearing centerline and the measurement system centerline location. This axial position offset of the bearing and the sensor element(s) forces the bearing to respond to shaft vibrations in an inconsistent (out of phase), and de-stabilizing manner, with potentially catastrophic results.

Furthermore, in many applications it is desirable to isolate the magnetic bearing actuator from a surrounding hostile environment, where hostile could be defined as a hot, high pressure, caustic fluid, or other un-hospitable substances. One method of doing this, which is typical within the industry, is to introduce a thin non-magnetic protective material barrier, such as stainless steel, between the actuator and the environment. This barrier, which is referred to as a "can" within the industry, environmentally protects the magnetic actuator, while providing the magnetic flux with an unimpeded path to the suspended mass. Thus, the mass can be completely surrounded in a hostile environment without deleterious effects on the magnetic bearing system.

Unfortunately, existing position measurement systems must have an unobstructed view of, or access to, the supported mass. This means that those sensors, such as depicted in the prior art of FIG. 2, can not be protected by a "can" as is the bearing actuator. This then requires developing a sensing system that can be environmentally isolated to the same extent as the bearings.

It is therefore imperative for successful operation of any magnetic bearing system, especially with operation in hostile environs or with the potential for a non-co-location problem, to develop a position sensing system that is integrated into the magnetic bearing envelope. Moreover, it is desirable that such a position sensing system utilize one or more sensors which do not adversely affect or degrade the performance of the magnetic bearing.

SUMMARY OF THE INVENTION

According to the present invention, the position control for a magnetic bearing system is achieved by creating a secondary or "shunt" flux path in parallel to the primary flux path of a magnetic actuator. The secondary path is designed such that a small, and predictable, amount of flux generated by the actuator is "shunted" through a secondary path. The amount of shunted flux is dependant on the position of the moveable mass relative to the stationary actuator. By measuring the amount of flux in the shunt path, and combining the measurement with other information readily available within the bearing controller, the position of the moveable element can be determined and controlled.

The current state of the art in magnetic bearings utilizes a constant width backiron segment. This backiron segment can be either the same width as, or slightly wider than, the legs. The design which utilizes all iron segments of the same width is based on the assumption that there is no flux leakage. The design in which the backiron is wider than the legs allows for a uniform iron flux density in the presence of flux leakage.

An embodiment of the present invention places a gap in the backiron, into which a flux sensing device is installed/inserted. If a constant width backiron were used with the present invention, the cross sectional thickness of the backiron would be reduced adjacent to the sensor gap by an amount equal to the width of the gap. This would result in a flux choke point that would reduce the total flux carrying capacity of the bearing, degrading performance.

To eliminate this problem the bulge geometry is utilized. The bulge extends the backiron into a currently vacant portion of the bearing. The bulge increases the overall width of the backiron by an amount equal to the sensor gap width, resulting in a geometry in which the minimum cross sectional area of the backiron available to the magnetic flux is equal to the nominal backiron cross sectional area in a typical bearing. Thus the only function of the bulge is to eliminate the flux choke point that would otherwise result from the introduction of the sensor gap. By having the bulge extend inward, this can be accomplished without increasing the bearing size.

One result of forming the bulge and placing the sensor gap in the backiron is that the main flux path is split into two branches around the sensor gap. It has been determined, through finite element analysis (FEA) modeling of multiple geometries, that the flux density in the sensor gap is most uniform if the two branches of the main flux path are of substantially equal cross sectional area. However, even when the two branches are identically equal in cross sectional area, significant non-uniformities exist in the sensor gap flux field. It has been determined, again by the FEA modeling, that the remaining non-uniformities are due to the fact that the two branches of the flux path are not of equal length. The notches that are included in the preferred embodiment of the present invention serve to substantially equalize the lengths of the two branches. This results in the highest level of uniformity (symmetry) of the flux field in the sensor gap.

According to one particular aspect of the invention, a magnetic bearing is provided which includes a stator assembly in which a magnetic flux path is generated for supporting a mass; and a sensor positioned in the stator assembly for sensing flux in the magnetic flux path; wherein the stator assembly is operatively configured in combination with the sensor such that in the stator assembly a flux density in the magnetic flux path in the area of the sensor is substantially similar to or less than a flux density elsewhere in the stator assembly along the magnetic flux path.

According to another aspect of the invention, a magnetic bearing is provided which includes a stator assembly in which a magnetic flux path is generated for supporting a mass; and a sensor included in the stator assembly along the magnetic flux path; wherein the stator assembly is shaped for minimizing deleterious effects, caused by the presence of the sensor, on a flux density of the magnetic flux path in the stator assembly.

According to still another aspect of the invention, a magnetic bearing is provided which includes a stator assembly in which a magnetic flux path is generated for supporting a mass; and a sensor positioned in the stator assembly for sensing flux in the magnetic flux path; wherein the stator assembly is operatively configured such that a cross-sectional area of the stator assembly available to flux in the magnetic flux path in the area of the sensor is substantially similar to or greater than a cross-sectional area of the stator assembly available to flux in the magnetic flux path elsewhere in the stator assembly.

In accordance with yet another aspect of the invention, an electric apparatus is provided including a magnetic core member in which a magnetic flux path is generated for performing a function; and a sensor included in the magnetic core member along the magnetic flux path; wherein the magnetic core member is shaped for minimizing deleterious effects, caused by the presence of the sensor, on a flux distribution in the magnetic flux path in the magnetic core member.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 10 gives a mathematical description of the surface represented in FIG. 9.

DESCRIPTION OF THE PREFERRED EMBODIMENTS

Figure 1:
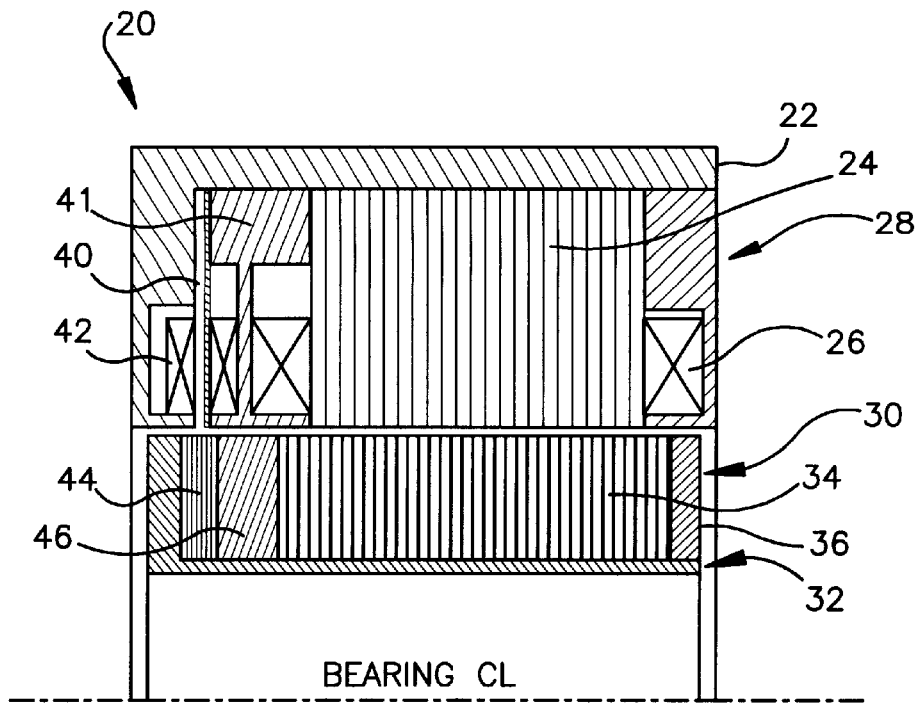
FIG. 1 is a radial cross sectional view of a conventional magnetic bearing including a position sensor.
Figure 2:
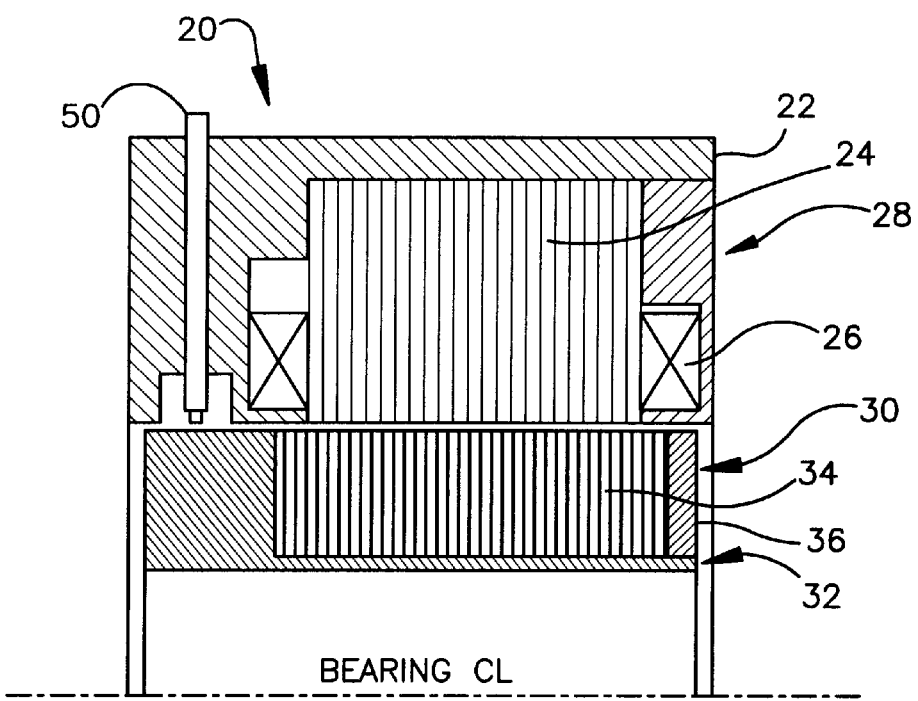
FIG. 2 is a radial cross sectional view of another conventional magnetic bearing including a position sensor.

The present invention will now be described with reference to the drawings in which like reference numerals are used to refer to like elements throughout.

Figure 3:
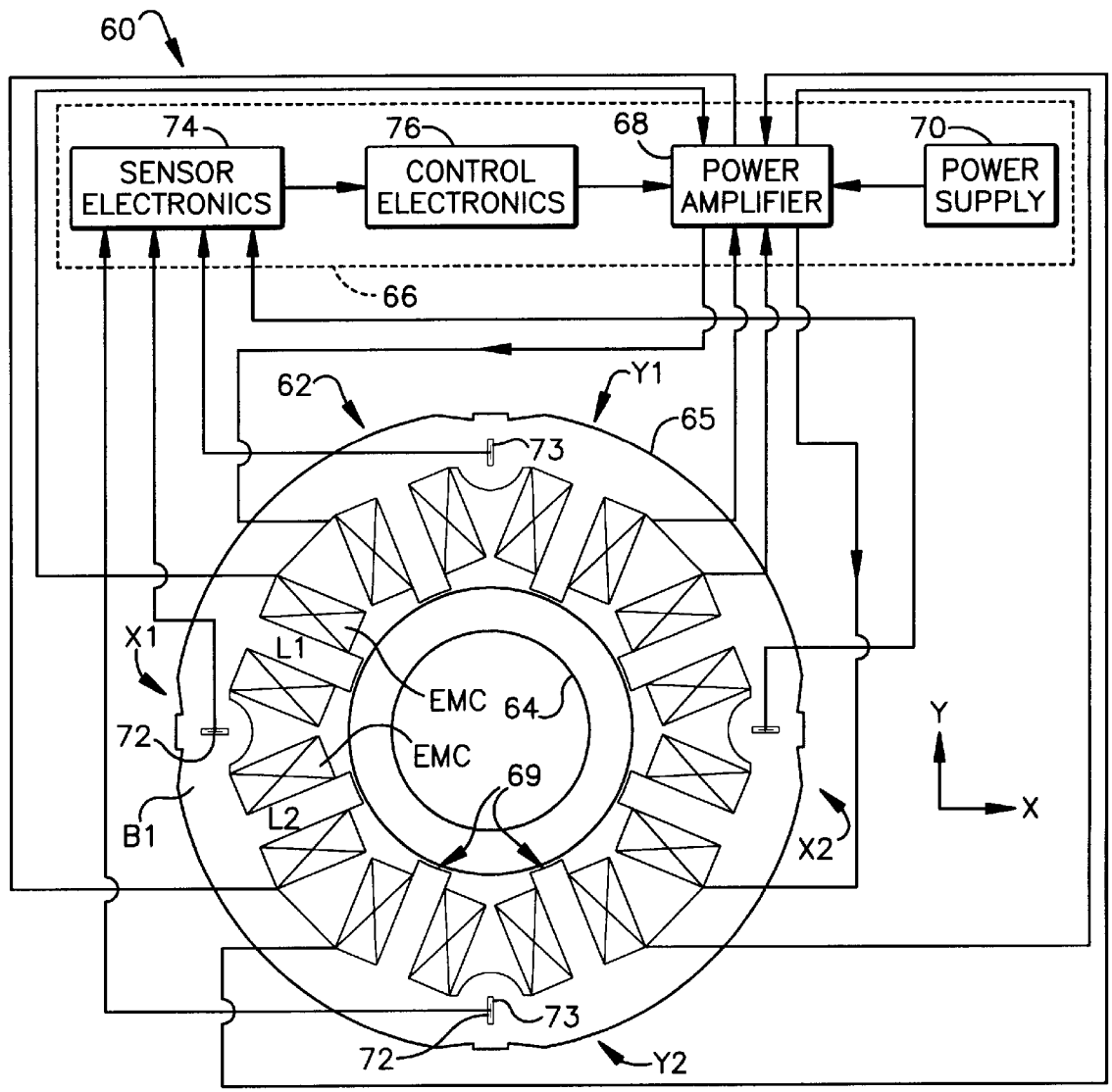
FIG. 3 is a schematic of a magnetic bearing system in accordance with the present invention.

Referring initially to FIG. 3, a schematic of a magnetic bearing system 60 in accordance with the present invention is shown. The system 60 includes a magnetic bearing 62 for supporting a rotatable mass 64. The magnetic bearing 62 comprises a stator assembly 65 made of iron or some other magnetic material. The magnetic bearing 62 is driven by a driver circuit 66 which includes a power amplifier 68 for providing current to the electromagnetic coils of the bearing actuators. The current provides the magnetic flux in the gaps between the actuators and the supported mass 64.

More specifically, the bearing 62 in the exemplary embodiment includes Y-axis actuators Y1 and Y2, and X-axis actuators X1 and X2. Each actuator includes a pair of legs L1 and L2 joined by a backiron portion BI (shown more clearly in FIG. 5) which make up a part of the stator assembly 65. The power amplifier 68 provides current to electromagnetic coils EMC which are formed respectively on each leg. The power amplifier 68 provides the current as determined by control electronics 76 to the electromagnetic coils EMC in each of the actuators in order to produce a magnetic flux in the gaps 69 between the legs L1 and L2 and the supported mass 64. Power is provided to the power amplifier via a power supply 70 included in the driver circuit 66.

Each actuator X1, X2, Y1, Y2 includes a flux sensor element 72 such as a Hall effect device or an inductive coil for sensing the amount of flux generated in the actuator by the electromagnetic coils EMC. Such flux information is then processed to determine the position of the supported mass 64. As is described more fully below in connection with FIGS. 4 and 5, the flux sensors 72 are each respectively positioned in a sensor gap 73 formed in the backiron portion BI of a corresponding actuator. The gap 73 is located such that a secondary, or shunt, flux path is formed in parallel with the main flux path of the actuator. The secondary flux path is formed such that a small amount of the bearing magnetic flux is shunted into this secondary path. The amount of shunted flux varies in a known relationship with the position of the supported element of the bearing. By quantifying the amount of shunted flux, using any number of methods, the position of the supported mass can be determined.

Specifically, the output of each flux sensor 72 is fed back to a sensor electronics circuit 74 which conditions the signal from each of the flux sensors 72 for further processing by the control electronics 76 included in the driver circuit 66.

Because the output of each flux sensor 72 is a function of the flux density in the respective actuator, and the flux density in the actuator is directly related to the EMC current, and indirectly related to the gap 69 for each of the actuators, the position of the supported mass 64 can be inferred. The simplified form of the below equation that describes this relationship as $$B = \frac{\mu_o * Ag * N * I}{c'}$$

where, $\mu_o$=the permeability of free space (3.1918*10$^{-8}$)

Ag=the projected area of the gap

N=The number of turns of wire in the EMC

I=the current in the coils c'=the effective gap between the actuator and the supported mass (ie., the sensor gap)

B=the flux density in the effective gap

Therefore, since $\mu_o$ is a constant, and Ag and N are fixed known qualities, if I and B can be measured, then c' can be determined.

The control electronics 76, by definition, controls and continuously monitors in real time the currents applied by the power amplifier 68 to each of the actuators (X1, X2, Y1, Y2). Each of the flux sensors 72 also monitors in real time the flux density in the actuators. Such flux density information for each of the actuators is provided from the flux sensors 72 to the control electronics 76 via the sensor electronics 74. The control electronics 76 is programmed to carry out the above calculation for each of the actuators X1, X2, Y1, Y2. Therefore, the effective gap c' is known for each of the actuators, and therefore the position of the supported mass 64 can be known in real time.

The control electronics 76 is further programmed to process the effective gap information from the respective actuators using conventional techniques in order to ascertain the position of the supported mass 64 relative to the stator assembly 65. The control electronics 76 then provides control information to the power amplifier 68 to adjust the amount of current provided to the EMCs of the respective actuators in order to maintain the desired positioning of the supported mass 64.

Accordingly, the combination of each actuator X1, X2, Y1, Y2, each flux sensor 72, the sensor electronics 74, the control electronics 76 and the power amplifier 68 provides closed-loop position control of the supported mass 64. Of benefit to such closed-loop control is the relationship between the sensors 72 and the operation of the magnetic bearing 62. As is explained more fully below, the combination of the configuration of the stator assembly 65 and/or the placement of the sensors 72 in each actuator results in a position sensing system in which the sensors 72 are integrated within the physical envelope of the bearing 62. Moreover, the sensors 72 are positioned so as not to degrade the performance of the magnetic bearing 62 by causing deleterious effects in the flux patterns within the actuators. In addition, the flux density incident on each flux sensor 72 is preferably configured so as to be generally linearly related to the main flux density in the actuator. Such features provide for more accurate position control as compared to conventional systems.

Figure 4:
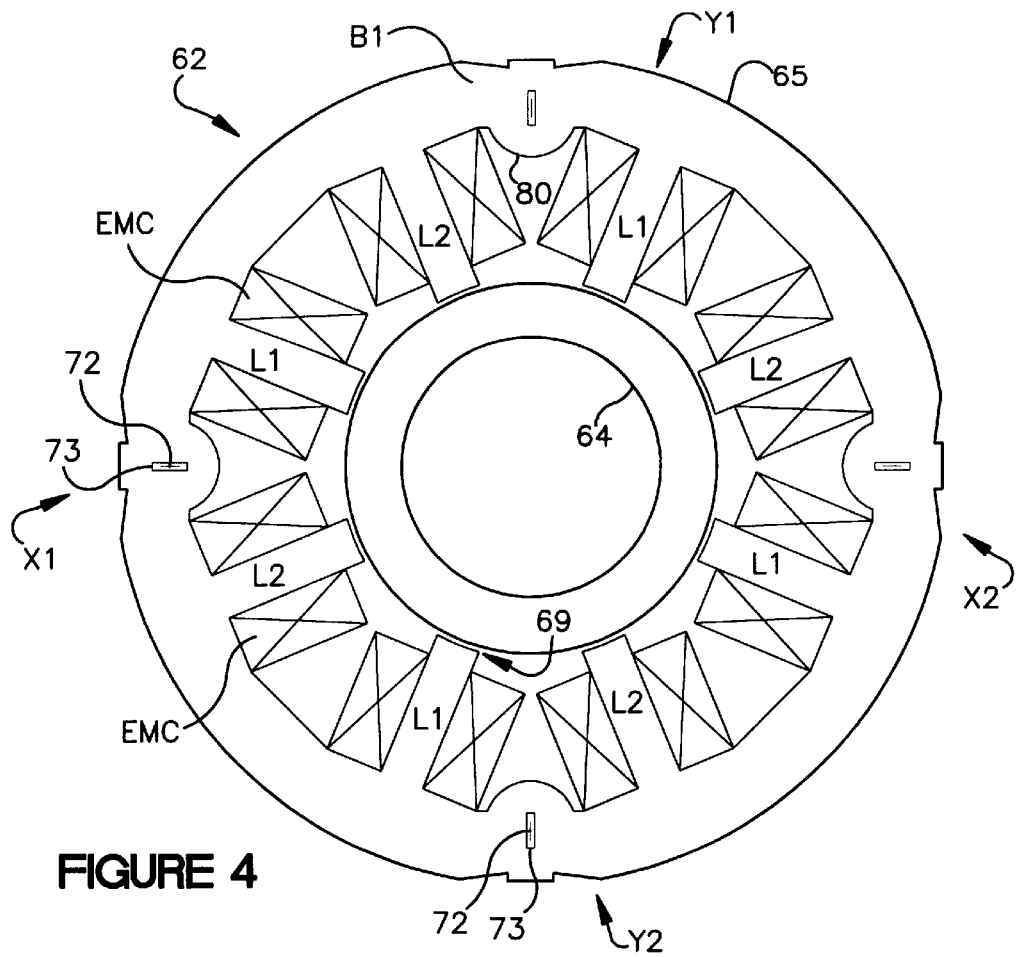
FIG. 4 is an axial cross sectional view of a magnetic bearing in accordance with one embodiment of the present invention.
Figure 5:
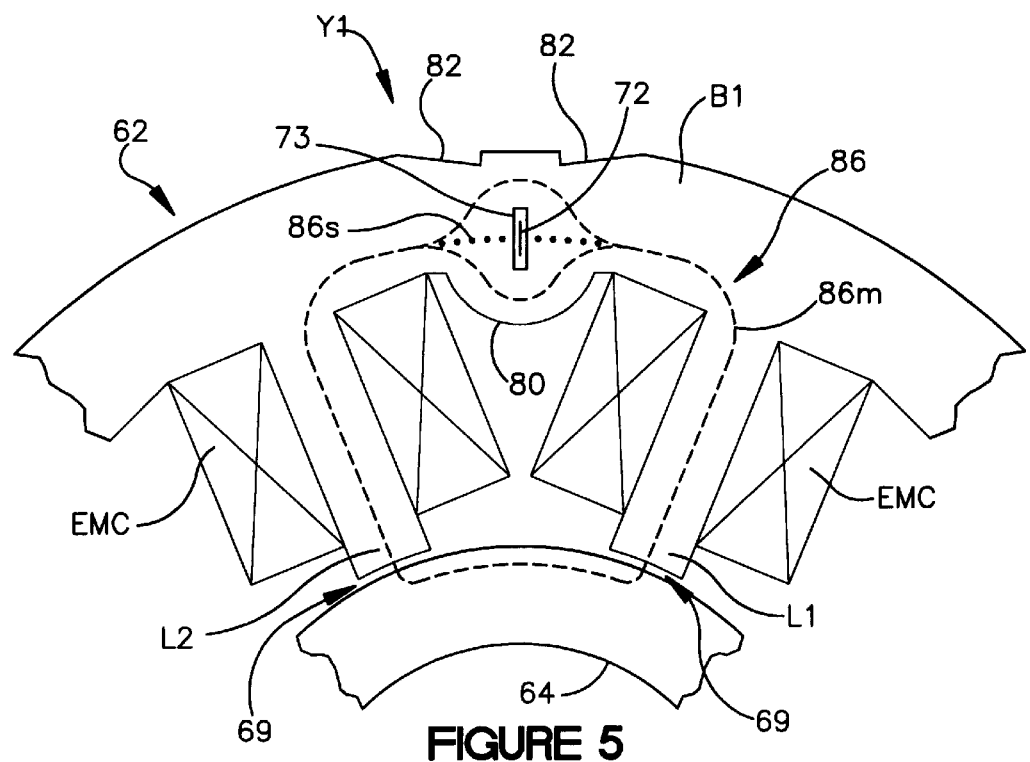
FIG. 5 is an enlarged axial cross sectional view of the magnetic bearing shown in FIG. 4 in relevant portion in accordance with the present invention.

FIG. 4 presents an enlarged view of the magnetic bearing 62. FIG. 5 is an enlarged view of actuator Y1, but it will be appreciated that the remaining actuators have a similar structure. Referring specifically to FIG. 5, the backiron BI has a generally arcuate cross-section with the legs L1 and L2 extending radially inward towards the supported mass 64. The backiron BI in the present embodiment includes a bulge 80 interposed between the legs L1 and L2 and which extends radially inward. Those familiar in the art will appreciate that such bulge 80 ordinarily is not found in the backiron of a conventional magnetic bearing. The bulge 80 has a generally rounded profile as shown, although it will be appreciated that other profiles are possible. The sensor gap 73 for allowing placement of the flux sensor 72 is machined or otherwise formed in approximately the center of the bulge 80 portion of the backiron BI. The backiron BI further includes a pair of symmetric notches 82 on opposite sides of the sensor gap 73 in a direction radially outward from the sensor gap 73.

By virtue of the geometry shown in FIG. 5, the provision of current in the electromagnetic coils EMC will create a continuous flux path through the actuator Y1 as represented by dashed line 86. The flux path 86 comprises a main flux path 86m which passes through leg L1, across the gap 69 between leg L1 and the supported mass 64, through the supported mass 64, across the gap 69 to leg L2, and through leg L2 back up through the backiron BI. Notably, however, in the area of the bulge 80, the main flux path 86*m* proceeds through the bulge 80 on opposite sides of the sensor gap 73 whereas a small secondary flux path 86*s* branches off from the main flux path 86*m* and traverses the sensor gap 73 with the flux sensor 72 therein.

The bulge 80, or some equivalent feature, is added to the backiron BI to maintain the cross sectional area of the flux path 86 as compared to a conventional magnetic bearing which does not include the gap 73. If the sensor gap 73 were placed in a conventional backiron BI without any other modifications, a flux choke point would be created and bearing performance would be degraded as will be appreciated. The bulge 80, or an equivalent feature, ensures that the total cross sectional area of the flux paths around the sensor gap 73 is greater than or equal to the cross sectional area of a given conventional backiron without the gap 73. As previously stated, this eliminates flux choke points and maintains bearing performance.

In other words, the bulge 80 or equivalent feature serves to provide sufficient cross sectional area of the main flux path through the backiron BI in order that the flux density of the flux path in the stator assembly proximate the sensor 72 is substantially similar or less than the flux density of the flux path elsewhere in the stator assembly. This results in the reluctance per unit length along the flux path within the stator assembly remaining generally uniform.

The notches 82 serve the purpose of substantially equalizing the lengths of the flux paths above and below the sensor gap 73 (as represented by dashed lines in FIG. 5). By creating equivalent (equal lengths and areas) parallel flux paths above and below the sensor gap 73, the main stream flux will be evenly distributed between the paths. This results in a symmetric flux distribution within the sensor gap 73. It will also be appreciated that forming the shunt or secondary path 86*s* with a bulge 80 to maintain the flux path area, and notches 82 to guide the flux, does not degrade the performance of the magnetic bearing 62 as compared to a conventional magnetic bearing design, nor does it increase the radial packaging dimension. Furthermore, there need be no axial offset between the sensors 72 and the magnetic bearing 62 itself as in the prior art. This eliminates the aforementioned problems relating to non-co-location.

For a given geometry around the sensor gap 73, the actual flux density in the sensor gap 73 will depend only on the flux density in the surrounding backiron BI material. This flux density as detected by the sensor 72, however, will depend on both the levels of current in the magnetic bearing (i.e., the current driven through the electromagnetic coils EMC) and the position of the supported mass 64. In order to function as a position sensor the changes in flux density due to current variations must be decoupled from the changes in flux density due to positional variations. This can only be accomplished if the relationship between flux density and current is known and repeatable.

Figure 7:
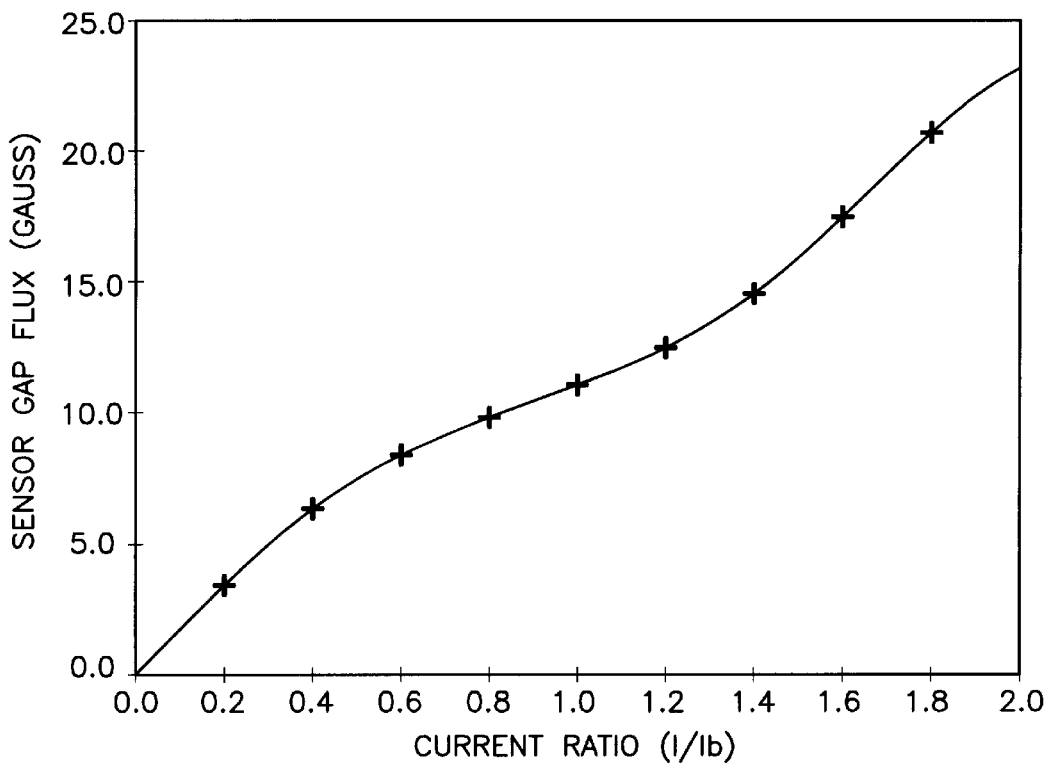
FIG. 7 is a graph showing a typical relationship between the flux density measured in the sensor gap of the present invention and the current in the bearing coils.

The geometry shown in FIG. 5, as described above, has been designed to produce a low order relationship between the bearing current and the sensor gap 73 flux density. An example of this relationship is shown in FIG. 7 and is based on a mass 64 in the form of a rotor centered in a magnetic bearing 62. The non-linearity of the relationship is due primarily to the non-linearities inherent in the relationship between the relative magnetic permeability of the backiron BI and mass 64 materials and the flux density present in those materials.

Figure 8:
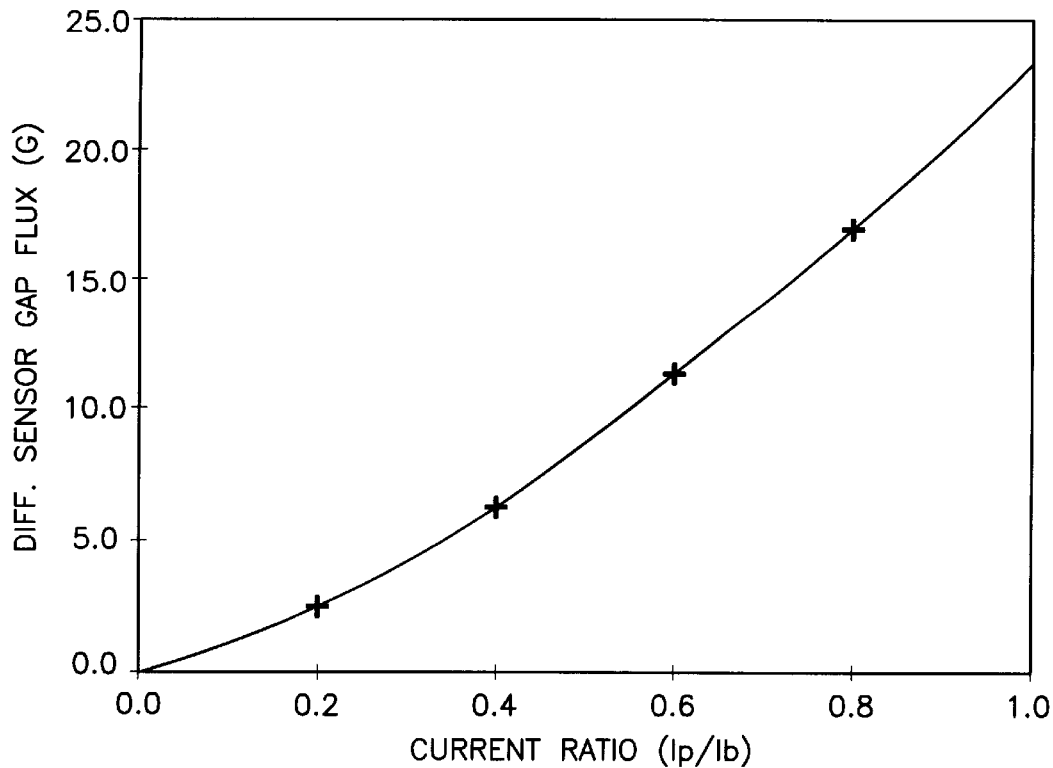
FIG. 8 is a graph showing the resulting relationship between the bearing perturbation current and the differential sensor gap flux density in accordance with the present invention. Such differential is defined as the difference between the measured sensor gap flux densities in two opposing bearing quadrants.

Using the flux density information as presented in FIG. 7 would result in a potential position measurement for each of the magnetic bearing quadrants, which in some cases may be beneficial. An alternative approach, however, is to combine the information from opposing and complementary quadrants (e.g., actuators X1 and X2, or Y1 and Y2) to determine a position measurement for each axis. By taking the difference of flux density readings in opposing quadrants, biasing influences are eliminated and a more accurate position measurement can be obtained. An example of this modified relationship, for a supported mass 64 centered in a bearing 62, is shown in FIG. 8. Comparing FIG. 7 and FIG. 8 it is seen that the order of the relationship between differential sensor gap flux density and perturbation current (FIG. 8) is lower than that of the individual sensor gap flux density measurements (FIG. 7). Using the differential measurements, therefore, reduces the complexity of the positional calculations.

In order to decouple the current and positional effects it is also necessary to know how the sensor gap 73 flux density vs. differential current relationship varies with positional changes. This information is shown, for a typical case, in FIG. 9. This figure shows equivalent curves for various positions of the mass 64. The positions have been normalized to the full design deflection of the mass 64. These curves represent a surface projection of the differential sensor gap 73 flux densities corresponding to all possible combinations of current and mass 64 displacement values. Note that any combination of current and differential sensor gap 73 flux density corresponds to a unique value of displacement. This is the basic requirement for sensor operation.

Figure 9:
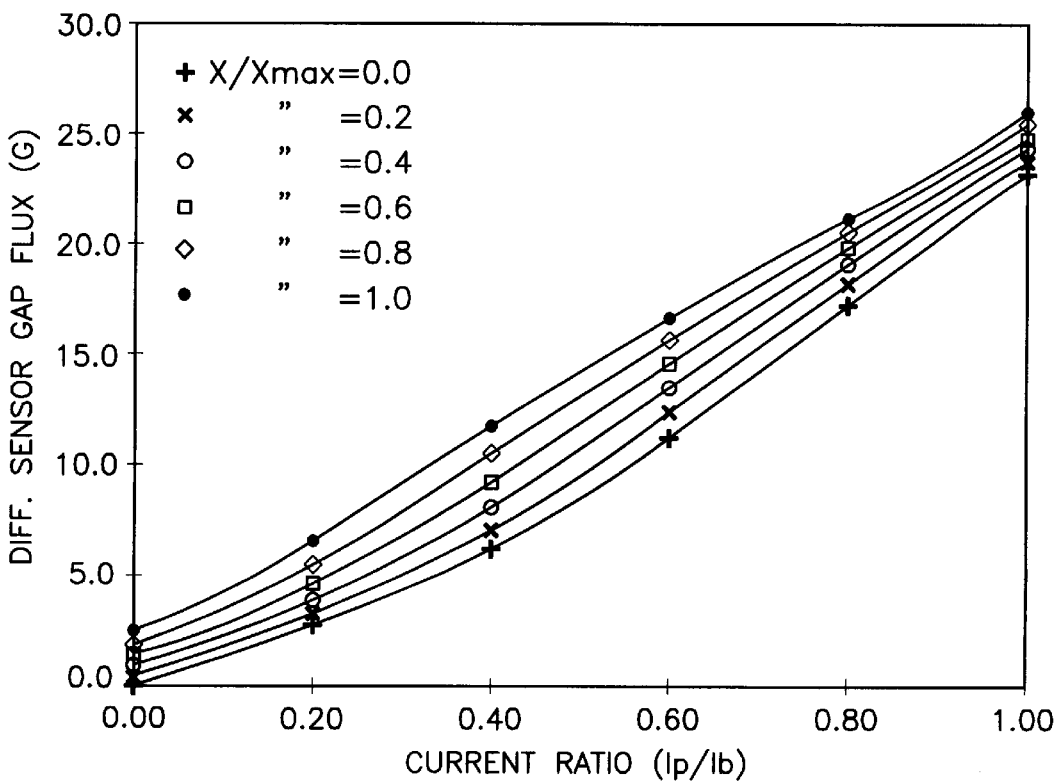
FIG. 9 is a graph expanding the relationship shown in FIG. 8, illustrating the effect of variations of the position of the supported body on the flux density.

In order to actually determine the position of the mass 64 based on the flux density and current measurements, the surface equation represented schematically in FIG. 9 must be solved for X(B,I), where B is the measured differential flux density and I is the measured current ratio. One simplistic approach to solving this problem, as a demonstration, is to curve fit orthogonal polynomials to the surface. The results of this procedure, applied with third and fourth order polynomials are shown in FIG. 10. While the resulting equation for X is somewhat unwieldy in this example, the procedure is clear. This approximation method gives results for X within 5% of the actual values, which is sufficient for most applications. Improved methods of calculating X may be used where desirable. The calculations themselves may be carried out by a microprocessor (not shown) in the control electronics 76 (FIG. 3).

Figure 11:
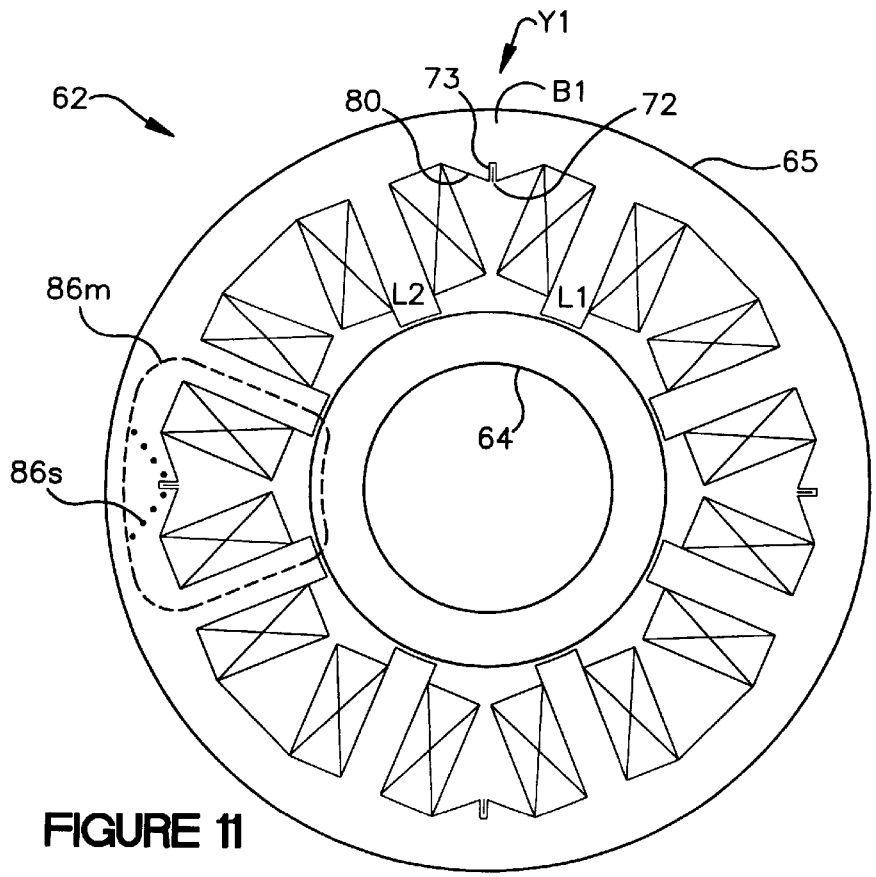
FIG. 11 is an axial cross sectional view of a magnetic bearing in accordance with another embodiment of the present invention.
Figure 12:
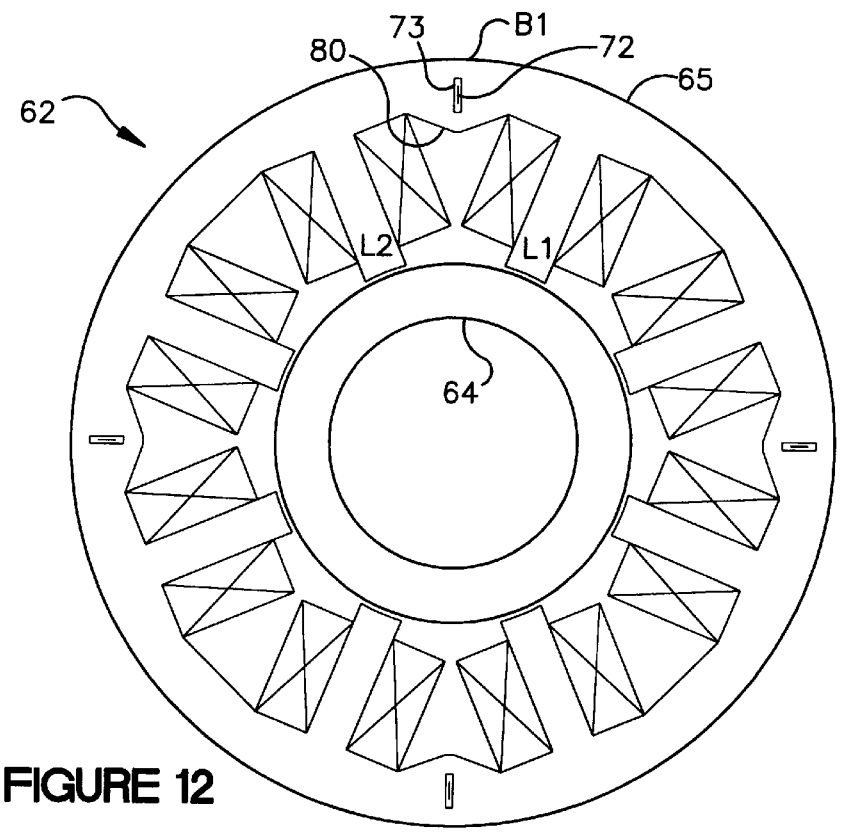
FIG. 12 is an axial cross sectional view of a magnetic bearing in accordance with still another embodiment of the present invention.

Alterative embodiments may also be developed that are substantially equivalent. The sensor gap 73 may be left open on one side as shown, for example, in FIG. 11. The backiron BI may be restricted in the area of the sensor gap 73. Coils may be added to the sensor gap area to help control the sensor gap flux distribution. The notches 82 may be eliminated as represented in FIG. 12, repositioned, and/or reconfigured. Additional changes may be made. None of these suggested variations impact the basic concept of providing a flux shunt in parallel with the main flux path, the measurement of which can be used to determine the value of flux density in the main path. The flux density in the main path can then be further combined with coil current information to determine the position of the supported element in a magnetic bearing system, as illustrated above.

Furthermore, although the invention is described primarily in the context of detecting the position of the mass 64 in a magnetic bearing, the invention has utility in a broad range of applications. For example, the flux sensor gap 73 and/or bulge 80 may be included in motors, generators, or other electric machines and/or transformers for measuring the flux in a secondary path in parallel with a main flux path in a magnetic core member such as the stator assembly. The flux sensor gap 73 and/or bulge can be located unobtrusively in the stator assembly, for example, while still providing linearized flux in the gap and without significantly affecting the standard operating characteristics of the device. The inclusion of the gap 73 does not increase the overall diameter of the stator assembly. At the same time, the gap 73 with a flux sensor 72 therein can provide information on shaft position and magnetic flux density for stable closed loop operation.

Figure 6A:
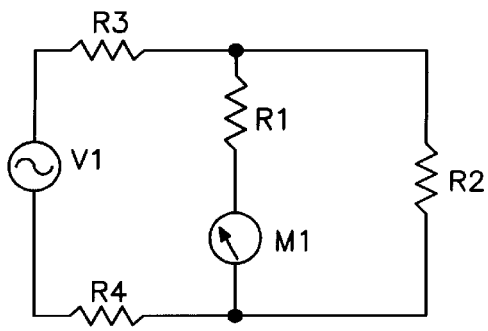
FIGS. 6a–6c represent electrical analogies of a magnetic bearing in accordance with the present invention.
Figure 6B:
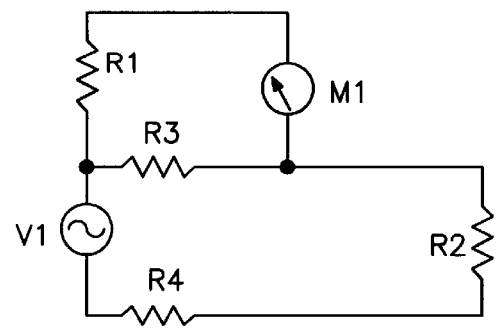
Figure 6C:
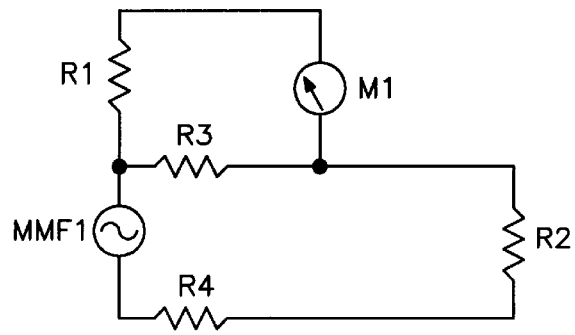

Referring briefly back to FIGS. 6a–6c, these figures help to illustrate the theory behind the operation of a flux position sensor of the present invention. FIG. 4a is a classical electrical schematic depicting a means of monitoring high levels of current applied to a load. V1 is a voltage source, such as a generator, that supplies the current to develop power across R2, the load resistor. The two resistors, R3 and R4, represent very small resistances that would be used to connect the devices together. Generally speaking, R3 and R4 are ignored by those skilled in the art, for their resistive value is normally several orders of magnitude smaller than the load resistance. For clarity in describing the present invention, and for ease in comparison between the more familiar electrical world and its' magnetic counterpart, these devices are shown.

Several different techniques could be used to obtain the value of the current (I2) flowing through R2. The first would be to place in series with R2 a meter to measure the current. This technique would be applicable, if the expected current level was less than the maximum general purpose current meter (0.1 A or 100 mA are reasonable numbers). However, if the current levels are large, such as 1000 Amps this method becomes impractical. A second technique, which is referred to as a current shunt, is depicted in FIG. 6a which allows M1 to measure high levels of R2 current. R1 is a resistor of fixed known value that is selected to be a much higher than R2, for example R1=R2×10000. Therefore, using the laws of current flow and the proportionality constant from this example, 100 mA of M1 current would equate to 1000 A of current in R2. It will be appreciated that the current generated by V1 will be equal to 1000.1 A. It will also be appreciated that the placement of R1 and M1 is not case sensitive, that is, the same current could be measured if the meter is placed in parallel with R3 or R4 as shown in FIG. 6b, however, with some adjustment made to the original proportionality constant.

A magnetic equivalent of FIG. 6b is presented in FIG. 6c, with the appropriate translation of terms. The Magneto-Motive-Force (MMF) is the magnetic equivalent of voltage and it is generated in the classic form by wrapping a conductive electrical wire around a magnetic material. The flux generated in the core is the magnetic equivalent of electrical current. Reluctance (R) is the equivalent of resistance, and it is a known physical property that is directly proportional to the length of the magnetic path, and inversely proportional to the relative permeability ($\mu_r$) of the material and the cross sectional magnetic area. Air, for example, has a $\mu_r$ of 1, while good magnetic materials have $\mu_r$ of 3000–6000. In a magnetic Bearing, the force developed between the stationary elements (stator assembly 65) and the movable body (mass 64) is generated by the flux density developed in the "gap" between the stator assembly and mass. In FIG. 6c, R2 represents the reluctance of that gap, and R3 and R4 represent the reluctance of the magnetic material in the stator assembly and the mass, respectively. As with its electrical counterpart, the reluctance values of R3 and R4 are very small compared to the value of R2. FIG. 6c functions very similarly to its' electrical counterpart, in that very small amounts of flux are proportionally shunted through M1. However, FIG. 6c differs from FIG. 6b in that R3 and R4 are determined by the physical characteristics of the magnetic material, the level of flux density present, and the geometric pattern that was developed to shunt a portion of the "mainstream" flux to M1. Hence, the geometry of the bulge 80, notches 82, gap 73, etc. will determine which portion of the main flux path is shunted in parallel for detecting flux.

Although the invention has been shown and described with respect to certain preferred embodiments, it is obvious that equivalents and modifications will occur to others skilled in the art upon the reading and understanding of the specification. For example, although the preferred location of the sensor 72 in each actuator is proximate a bulge portion, other locations are possible without departing from the scope of the invention. As an example, one or more sensors 72 may be distributed in a leg L1, L2 of the stator assembly 65. However, the backiron BI is preferred due to availability of usable space. Moreover, although the backiron BI is referred to using the term "iron", it will be appreciated that the backiron BI and the stator assembly 65 as a whole can be made up of any of several types of materials conventionally used for stator assemblies.

Additionally, although the invention has been described in relation to radial multi-pole magnetic bearings, it will be appreciated that the invention is equally applicable to radial homo-polar magnetic bearings, axial magnetic bearings, and other non-bearing magnetic configurations as well.

Furthermore, the invention is described primarily in the context of sensing the flux in the stator assembly for purposes of determining position information. It will be appreciated by those skilled in the art that a sensor for determining position is an essential requirement of an active magnetic bearing system. Nevertheless the flux sensing properties of the present invention could also be used in applications other than for determining position. For example, the flux sensor of the present invention is suitable for use in virtually any situation requiring the detection of the amount of flux in a magnetic path.

It is noted that the present invention would be usable on a wide range of bearings without the bulge and notch geometry. Eliminating the bulge could, however, degrade the performance of the resulting bearing by an amount equal to the square of the ratio of the minimum iron cross sectional width to the nominal iron cross sectional width. Including the bulge, as described above, results in no substantial degradation of the performance of the modified bearing. Similarly the notches are not required for the present invention to work. The symmetric flux field that results from the inclusion of the notches, however, makes the system less sensitive to errors resulting from non-uniform placement of the flux sensing devices in the sensor gaps.

The present invention includes all such equivalents and modifications, and is limited only by the scope of the following claims.

What is claimed is:

1. A magnetic bearing, comprising:
   a stator assembly in which a magnetic flux path is generated for supporting a mass; and
   a sensor positioned in the stator assembly for sensing flux in the magnetic flux path;
   wherein the stator assembly is operatively configured in combination with the sensor such that in the stator assembly a flux density in the magnetic flux path in the area of the sensor is substantially similar to or less than a flux density elsewhere in the stator assembly along the magnetic flux path and wherein the magnetic flux path includes a main flux path and a secondary flux path in parallel with the main flux path and wherein the sensor is located on the secondary flux path.

2. A magnetic bearing, comprising a stator assembly in which a magnetic flux path is generated for supporting a mass, and a sensor positioned in the stator assembly for sensing flux in the magnetic flux path;

wherein the stator assembly is operatively configured in combination with the sensor such that in the stator assembly a flux density in the magnetic flux path in the area of the sensor is substantially similar to or less than a flux density elsewhere in the stator assembly along the magnetic flux path; and wherein the stator assembly includes a gap in which the sensor is located and the magnetic flux path in the area of the gap comprises a main flux path and a secondary flux path in parallel with the main flux path, the secondary flux path traversing the gap.

3. A magnetic bearing comprising a stator assembly in which a magnetic flux path is generated for supporting a mass and a sensor positioned in the stator assembly for sensing flux in the magnetic flux path;

wherein the stator assembly is operatively configured in combination with the sensor such that in the stator assembly a flux density in the magnetic flux path in the area of the sensor is substantially similar to or less than a flux density elsewhere in the stator assembly along the magnetic flux path;

wherein the stator assembly includes a gap in which the sensor is located and the magnetic flux path in the area of the gap comprises a main flux path and a secondary flux path in parallel with the main flux path, the secondary flux path traversing the gap; and wherein the stator assembly comprises a curved backiron portion having two legs extending radially inward and a bulge portion located between the two legs and also extending radially inward, and the gap is formed within the backiron portion proximate the bulge in which the sensor is located.

4. The magnetic bearing of claim 3, further comprising at least one notch in the backiron portion on a side radially opposite the bulge.

5. The magnetic bearing of claim 2, wherein the stator assembly includes at least one actuator for supporting the mass based on a drive current applied to the at least one actuator, and a flux density of the secondary flux path is generally linearly related to the drive current.

6. The magnetic bearing of claim 1, wherein the sensor comprises a Hall effect device.

7. A position sensing system, comprising:
the magnetic bearing of claim 1; and
means for processing an output of the sensor to determine a position of the supported mass.

8. An active magnetic bearing system, comprising:
the magnetic bearing of claim 1, the magnetic bearing including at least one actuator for supporting the mass based on a drive current applied to the at least one actuator; and
means for controlling the drive current applied to the at least one actuator based on an output of the sensor.

9. A magnetic bearing, comprising:
a stator assembly in which a magnetic flux path is generated for supporting a mass; and
a sensor included in the stator assembly along the magnetic flux path for sensing flux in the magnetic flux path;

wherein the stator assembly is shaped for minimizing deleterious effects, caused by the presence of the sensor, on a flux distribution in the magnetic flux path in the stator assembly;

wherein the magnetic flux path includes a main flux path and a secondary flux path in parallel with the main flux path; and wherein the sensor is located on the secondary flux path.

10. The magnetic bearing of claim 9, the stator assembly comprising a curved backiron portion having two legs extending radially inward and a gap within the backiron portion in which the sensor is located.

11. A magnetic bearing comprising a stator assembly in which a magnetic flux path is generated for supporting a mass and a sensor included in the stator assembly along the magnetic flux path for sensing flux in the magnetic flux path;

wherein the stator assembly is shaped for minimizing deleterious effects, caused by the presence of the sensor, on a flux distribution in the magnetic flux path in the stator assembly;

wherein the stator assembly comprises a curved backiron portion having two legs extending radially inward and a gap within the backiron portion in which the sensor is located; and wherein the backiron portion includes a bulge portion which extends radially inward and the gap within the backiron portion is proximate the bulge.

12. The magnetic bearing of claim 11, wherein the sensor is positioned at a location within the stator assembly along a secondary flux path which is in parallel with a main flux path generated by the magnetic bearing.

13. The magnetic bearing of claim 11, wherein the gap is located at an edge of the bulge.

14. The magnetic bearing of claim 11, wherein the gap is located in an interior portion of the bulge.

15. The magnetic bearing of claim 14, further comprising at least one notch in the backiron portion on a side radially opposite the bulge.

16. The magnetic bearing of claim 9, wherein the sensor comprises a Hall effect device.

17. The magnetic bearing of claim 9, wherein the sensor comprises a coil.

18. A position sensing system, comprising:
the magnetic bearing of claim 9; and
means for processing an output of the sensor to determine a position of the supported mass.

19. An active magnetic bearing system, comprising:
the magnetic bearing of claim 9, the magnetic bearing including at least one actuator for supporting the mass based on a drive current applied to the at least one actuator; and
means for controlling the drive current applied to the at least one actuator based on an output of the sensor.

20. A magnetic bearing, comprising:
a stator assembly in which a magnetic flux path is generated for supporting a mass; and
a sensor positioned in the stator assembly for sensing flux in the magnetic flux path;

wherein the stator assembly is operatively configured such that a cross-sectional area of the stator assembly available to flux in the magnetic flux path in the area of the sensor is substantially similar to or greater than a cross-sectional area of the stator assembly available to flux in the magnetic flux path elsewhere in the stator assembly;

wherein the magnetic flux path includes a main flux path and a secondary flux path in parallel with the main flux path; and wherein the sensor is located on the secondary flux path.

21. A magnetic bearing comprising a stator assembly in which a magnetic flux path is generated for supporting a mass and a sensor positioned in the stator assembly for sensing flux in the magnetic flux path;

wherein the stator assembly is operatively configured such that a cross-sectional area of the stator assembly available to flux in the magnetic flux path in the area of the sensor is substantially similar to or greater than a cross-sectional area of the stator assembly available to flux in the magnetic flux path elsewhere in the stator assembly; and wherein the stator assembly is shaped such that in the area of the sensor the magnetic flux path comprises a main flux path adjacent the sensor and a secondary flux path which intersects the sensor.

22. The magnetic bearing of claim 21, wherein the flux density in the secondary flux path is substantially less than the flux density in the main flux path.

23. The magnetic bearing of claim 21, wherein the stator assembly includes at least one actuator for supporting the mass based on a drive current applied to the at least one actuator, and a flux density of the secondary flux path is generally linearly related to the drive current in a range of operation of the magnetic bearing.

24. A position sensing system, comprising:

the magnetic bearing of claim 20; and means for processing an output of the sensor to determine a position of the supported mass.

25. An active magnetic bearing system, comprising:

the magnetic bearing of claim 20, the magnetic bearing including at least one actuator for supporting the mass based on a drive current applied to the at least one actuator; and means for controlling the drive current applied to the at least one actuator based on an output of the sensor.

26. An electric apparatus, comprising:

a magnetic core member in which a magnetic flux path is generated for performing a function; and a sensor included in the magnetic core member along the magnetic flux path for sensing flux in the magnetic flux path;

wherein the magnetic core member is shaped for minimizing deleterious effects, caused by the presence of the sensor, on a flux distribution in the magnetic flux path in the magnetic core member;

wherein the magnetic flux path includes a main flux path and a secondary flux path in parallel with the main flux path; and wherein the sensor is located on the secondary flux path.

27. An electric apparatus comprising a magnetic core member in which a magnetic flux path is generated for performing a function and a sensor included in the magnetic core member along the magnetic flux path for sensing flux in the magnetic flux path;

wherein the magnetic core member is shaped for minimizing deleterious effects, caused by the presence of the sensor, on a flux distribution in the magnetic flux path in the magnetic core member; and wherein the magnetic core member includes a stator assembly comprising a curved backiron portion having two legs extending radially inward and a gap within the backiron portion in which the sensor is located.

28. The electric apparatus of claim 27, wherein the backiron portion includes a bulge portion which extends radially inward and the gap within the backiron portion is proximate the bulge.

29. The electric apparatus of claim 28, wherein the sensor is positioned at a location within the stator assembly along a secondary flux path which is in parallel with a main flux path generated by the magnetic bearing.

30. The electric apparatus of claim 28, wherein the gap is located at an edge of the bulge.

31. The electric apparatus of claim 28, wherein the gap is located in an interior portion of the bulge.

32. The electric apparatus of claim 28, further comprising at least one notch in the backiron portion on a side radially opposite the bulge.

33. The electric apparatus of claim 26, wherein the sensor comprises a Hall effect device.

34. A magnetic bearing as set forth in claim 9 wherein the stator assembly includes a gap in which the sensor is located and wherein the secondary flux path traverses the gap.

35. A magnetic bearing as set forth in claim 20, wherein the stator assembly includes a gap in which the sensor is located and wherein the secondary flux path traverses the gap.

36. An electric apparatus as set forth in claim 26, wherein the magnetic core member includes a gap in which the sensor is located and wherein the secondary flux path traverses the gap.

* * * * *